United States Patent [19]

Buisman

[11] Patent Number: 5,518,619
[45] Date of Patent: May 21, 1996

[54] PROCESS FOR REMOVING SULPHUR COMPOUNDS FROM WATER

[75] Inventor: Cees J. N. Buisman, Harich, Netherlands

[73] Assignee: Paques B. V., Balk, Netherlands

[21] Appl. No.: 338,599

[22] PCT Filed: May 26, 1993

[86] PCT No.: PCT/NL93/00107

§ 371 Date: Nov. 18, 1994

§ 102(e) Date: Nov. 18, 1994

[87] PCT Pub. No.: WO93/24416

PCT Pub. Date: Dec. 9, 1993

[30] Foreign Application Priority Data

May 26, 1992 [NL] Netherlands ............................ 9200927
Jul. 14, 1992 [NL] Netherlands ............................ 9201268

[51] Int. Cl.⁶ ....................................................... C02F 3/28
[52] U.S. Cl. ........................................... 210/611; 210/631
[58] Field of Search ....................................... 210/601, 605, 210/610, 611, 630, 631

[56] References Cited

U.S. PATENT DOCUMENTS

| | | | |
|---|---|---|---|
| 4,124,501 | 11/1978 | Yen et al. | 210/611 |
| 4,200,523 | 4/1980 | Balmat | 210/631 |
| 4,519,912 | 5/1985 | Kauffman et al. | 210/611 |
| 4,584,271 | 4/1986 | Stern et al. | 210/611 |
| 4,614,588 | 9/1986 | Li | 210/611 |
| 4,966,704 | 10/1990 | Särner | 210/605 |
| 5,354,545 | 10/1994 | Buisman | 210/601 |
| 5,366,633 | 11/1994 | Buisman | 210/631 |

FOREIGN PATENT DOCUMENTS

| | | |
|---|---|---|
| 0436254 | 7/1991 | European Pat. Off. . |
| 0445043 | 9/1991 | European Pat. Off. . |
| 0451922 | 10/1991 | European Pat. Off. . |
| 9217410 | 10/1992 | European Pat. Off. ............... 210/605 |
| 2548213 | 1/1985 | France . |
| 90 19595 | 2/1984 | Japan . |
| 60-54792 | 3/1985 | Japan . |
| 62-155996 | 7/1987 | Japan . |
| 835972 | 6/1981 | U.S.S.R. ............................... 210/610 |

OTHER PUBLICATIONS by Rudolf Wagner, "Biofilme und Wassertechnologie", *GWF Wasser Abwasser*, vol. 132, No. 4, Apr. 1991, Munchen, Germany, pp. 197–207.

by J. P. Maree et al., "A Biological Process For Suphate Removal From Industrial Effluents", *Water SA*, vol. 12, No. 3, Jul. 1986, Pretoria, South Africa, pp. 139–144.

Primary Examiner—Peter A. Hruskoci
Assistant Examiner—Theodore M. Green
Attorney, Agent, or Firm—Young & Thompson

[57] ABSTRACT

The invention provides a method for removing sulphur compounds from water which contains low levels of organic matter, by anaerobic reduction of the sulphur compounds to sulphide, followed by partial oxidation of the sulphide to elementary sulphur. The cost-increasing consumption of electron donor (nutrient) during the anaerobic reduction is lowered by one or more of the following measures: a1) keeping the sulphate concentration in the anaerobic effluent at at least 500 mg/l; a2) keeping the sulphite concentration in the anaerobic effluent at at least 100 mg/l; b) keeping the salt concentration, expressed in sodium ion equivalents, in the anaerobic medium at at least 3 g/l; c) keeping the sulphide concentration in the anaerobic influent at at least 100 mg/l; d) introducing an inhibitor into the anaerobic treatment medium, which inhibitor is more toxic to the methane-producing bacteria than to incompletely oxidizing sulphate-reducing bacteria or sulphate-reducing bacteria oxidizing compounds having one carbon atom.

21 Claims, 2 Drawing Sheets

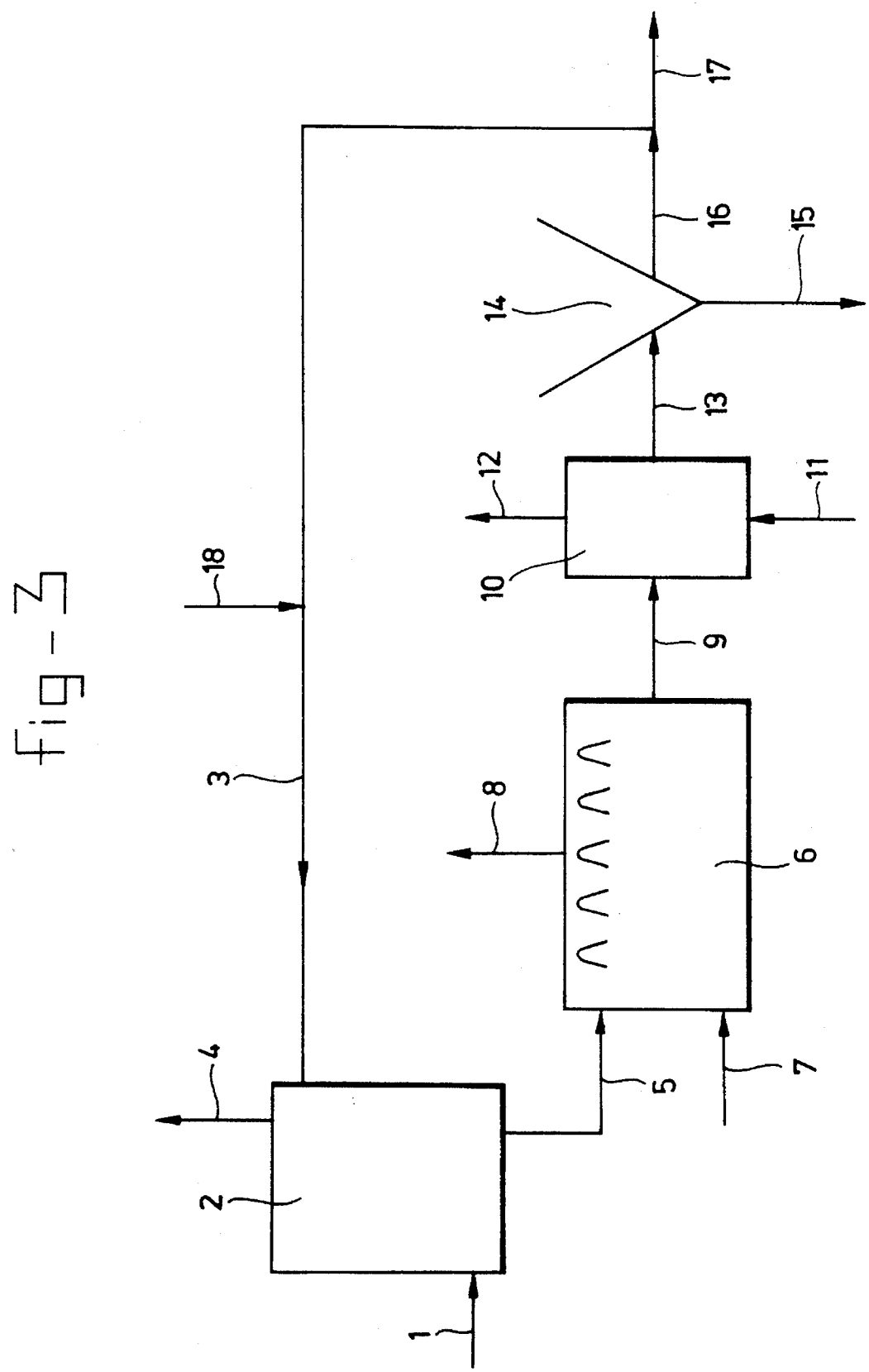

PROCESS FOR REMOVING SULPHUR COMPOUNDS FROM WATER

FIELD OF THE INVENTION

The invention relates to a process for removing sulphur compounds from water.

BACKGROUND OF THE INVENTION

The presence of sulphur compounds in water is usually an unacceptable factor. In the case of sulphate, sulphite and thiosulphate, the principal drawbacks are attack on the sewer, eutrophication and silting. In addition, heavy metals, which are particularly undesired because of their toxic properties, are frequently also present in water containing a large amount of sulphur compounds. One type of effluent in which sulphur compounds, in particular sulphite, are a constituent which is difficult to remove is the wash water from flue gas treatment plants. The flue gases from power stations and waste incinerators cause extensive pollution of the environment due to the presence of acidifying sulphur dioxide ($SO_2$). The harmful effects of acidification on forests, water, buildings etc. are generally known. Other types of effluents containing sulphur compounds are those originating from the printing industry, mining industry, and paper, rubber, leather and viscose industry.

In broad terms two types of method are available for the removal of sulphur-containing compounds, that is to say physicochemical methods and biological methods.

The physicochemical treatment methods include precipitation, ion exchange and membrane filtration (electrodialysis and reverse osmosis). Disadvantages of such methods are the high costs and the large stream of waste which results. In the case of flue gas treatment, absorption on lime or ammonia is usually employed. In this case large amounts of gypsum or ammonium sulphate are formed, which may be partly re-used. However, particularly in the case of gypsum the possible applications are becoming ever fewer because the quality demands for gypsum are becoming ever more stringent and the market for gypsum is becoming saturated.

In the case of a biological treatment, sulphate and sulphite and other sulphur compounds are reduced in an anaerobic step to give sulphide, which in turn can be oxidised to elementary sulphur. Such processes are known, for example from International patent application WO 91/16269 and European patent application 451922.

The advantage of such a method is that only small waste streams remain because the sulphur formed can be re-used. However, the disadvantage is that, especially when the effluent contains little organic matter, electron donors have to be added in order to provide sufficient reduction equivalents for the sulphate reducing bacteria (SRB). The most important electron donors are methanol, ethanol, glucose and other saccharides, organic acids, such as acetic, propionic, butyric and lactic acid, hydrogen and carbon monoxide. The use of these electron donors has the effect of substantially increasing the cost of this method of removal of sulphur from waste streams.

Organic compounds having two or more carbon atoms are found to decompose under anaerobic conditions to give hydrogen and acetate. The hydrogen can be used as an electron donor for the reduction of sulphate and sulphite and the like, but, under normal conditions, about 50% of the acetate is converted to methane by methane producing bacteria (MPB). Under normal anaerobic conditions, methanol is converted to methane for about 90%. In this case, methane formation has the disadvantages that additional electron donor has to be added (increasing the costs) and that a gas stream contaminated with $H_2S$ is formed which has to be washed and burnt off in the flare.

SUMMARY OF THE INVENTION

A number of measures have been found which, separately or in combination, result in a considerable reduction in the consumption of electron donor during the anaerobic treatment of sulphur compounds in waste water which contains low levels of organic matter, because little or not methane is produced.

The measures of the process according to the invention are:

a1) keeping the sulphate concentration in the anaerobic effluent at at least 500 mg/l;

a2) keeping the sulphite concentration in the anaerobic effluent at at least 100 mg/l;

b) keeping the salt concentration, expressed in sodium ion equivalents, in the anaerobic medium at at least 6 g/l under mesophilic conditions, or at least 3 g/l under thermophilic conditions;

c) keeping the sulphide concentration in the anaerobic influent at at least 100 mg/l;

d) introducing an inhibitor into the anaerobic treatment medium, which inhibitor is more toxic to the methane-producing bacteria than to incompletely oxidising sulphate-reducing bacteria or sulphate-reducing bacteria oxidising compounds having one carbon atom.

BRIEF DESCRIPTION OF THE DRAWINGS

FIG. 3 depicts an installation suitable for carrying out the process of the invention.

DETAILED DESCRIPTION OF THE INVENTION

Figure 1:
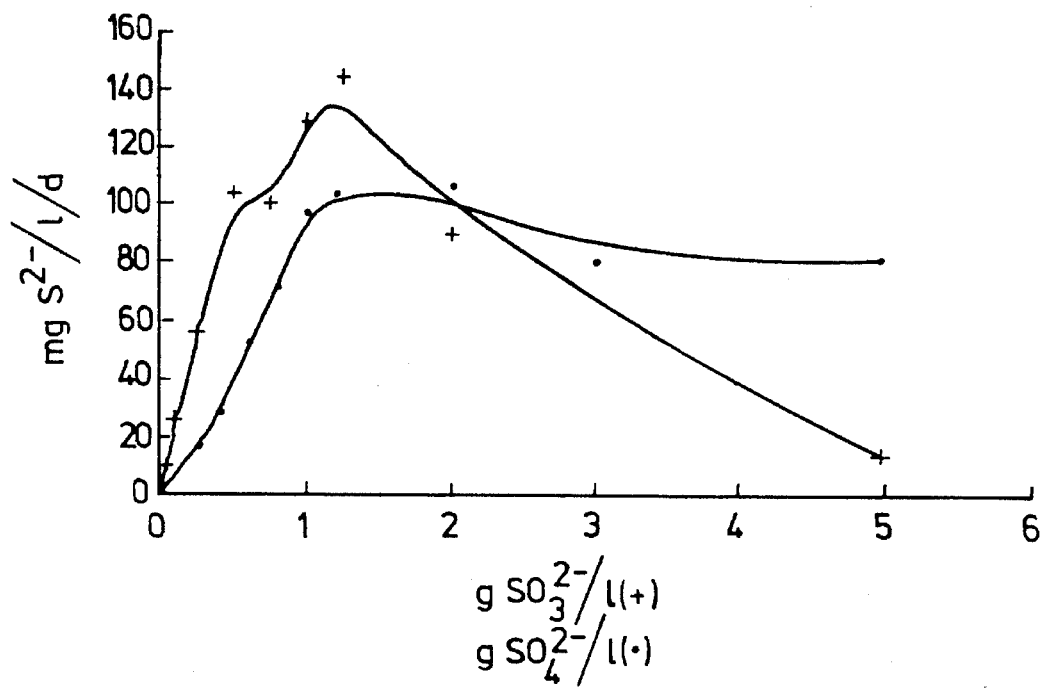
FIGS. 1 and 2 show the sulphide forming activity in mg per 1 of medium per day of the incompletely oxidizing sulphate-reducing bacteria and completely oxidizing sulphate-reducing bacteria respectively, as a function of the sulphate and sulphite concentration.

For reducing sulphur compounds to sulphide an electron donor is necessary, as follows from the reaction equations given below for sulphate, sulphite and thiosulphate.

$$SO_4^{2-} + 5 H_2O + 8 \text{ e} \rightarrow HS^- + 9 HO^-$$

$$SO_3^{2-} + 4 H_2O + 6 \text{ e} \rightarrow HS^- + 7 HO^-$$

$$S_2O_3^{2-} + 5 H_2O + 8 \text{ e} \rightarrow 2 HS^- + 8 HO^-$$

In case water containing little or no organic matter has to be treated, such an electron donor should be added. Depending on the applied process, the following electron donors may e.g. be used: hydrogen, carbon monoxide and organic compounds such as fatty acids, alcohols, sugars, starches and organic waste. Preferably, methanol, ethanol, glucose, polysaccharides such as sucrose, starch or cellulose, or a carboxylic acid (fatty acid) is used. The following reaction equations show the electron donating function for ethanol by way of example.

$$C_2H_5OH + 12 \text{ OH}^- \rightarrow \rightarrow CO_2 + 9 H_2O + 12 \text{ e (c-SRB)}$$

$C_2H_5OH + 4\ OH^- \rightarrow CH_3CO_2^- + 3\ H_2O + 4\ e$ (i-SRB)

If necessary, nutrient elements are also added in the form of nitrogen, phosphate and trace elements.

Using the method according to the invention, the efficiency of the electron donors is substantially improved.

Measure a) can relate to the sulphate concentration (a1). The minimum sulphate concentration according to the invention is the concentration in the effluent of the anaerobic reactor. For a mixed reactor this is also the concentration in the reactor itself (the anaerobic medium). The minimum sulphate concentration in the anaerobic effluent is especially applicable to waste waters which contain relatively low amounts of organic compounds, i.e. to which organic compounds (electron donors) have to be added. These low amounts of organic compounds can be expressed as a chemical oxygen demand (COD) of less than about 2 g, preferably less than 1.5 g $O_2$ per g of sulphate. It can also be expressed as a dissolved organic carbon content of less than about 600 mg C per g of sulphate. The minimum sulphate concentration applies especially under equilibrium conditions and/or under conditions where the major part, i.e. more than 50% or even more than 75%, of the incoming sulphate is reduced to sulphide.

Since sulphite and thiosulphate can be converted to sulphate by disproportionation under the reaction conditions, an equivalent concentration of sulphite or thiosulphate can also be used. The reaction equations for disproportionation of sulphite and thiosulphate are the following:

$4\ SO_3^{2-} + H^+ \rightarrow 3\ SO_4^{2-} + HS^-$ $S_2O_3^{2-} + OH^- \rightarrow SO_4^{2-} + HS^-$ From these equations a conversion factor of 4/3*80/96=1.11 for sulphate→sulphite and a conversion factor of 1*112/96= 1.16 for sulphate→thiosulphate follow. Thus a sulphate concentration of 500 mg/l corresponds to a sulphite concentration of 550 mg/l and to a thiosulphate concentration of 580 mg/l. It has been found however, that a sulphite level which is lower than the corresponding sulphate concentration is already effective in promoting reduction to sulphide. Thus the minimum sulphite concentration in the process of the invention is 100 mg/l.

Preferably, the sulphate concentration in the anaerobic effluent is kept at at least 900 mg/l. The upper limit of the sulphate concentration is primarily situated at the upper limit of the salt concentration (see b), which is in the order of 50 g/l for sodium sulphate. Furthermore, no more than 3 g of sulphate per l should preferably be converted to sulphide in the anaerobic reactor, since a higher sulphide concentration is toxic for the SRB. If no limiting conditions (such as a limitation of electron donor or nutrients) exist in the anaerobic reactor, the sulphate concentration of the reactor influent should therefore not be higher than 3 g/l. In case of thiosulphate the same concentrations as for sulphate can be used.

For sulphite (a2) the concentration is preferably at least 300, more preferably at least 400 mg/l mg per l of the anaerobic effluent. The upper limit for sulphite is determined by the toxicity limit of sulphite itself. Preferably, the sulphite concentration does not exceed 2 g/l.

The sulphate (sulphite, thiosulphate) concentration can be controlled in various ways. In recycling systems, wherein a large proportion of the purified water is recirculated, such as in flue gas desulphurisation, the sulphate (sulphite) concentration can be controlled by adjustment of the reaction conditions. In this way, the sulphate concentration in water having a high sulphate (or sulphite) load, for example >7 g/l, wherein a large part of the water is recycled and a small part is drained off, can be controlled by adjusting the added amount of electron donor or by limiting the concentration of nutrients, such as phosphate. In water treatment systems where there is hardly any recycling of water and the drain is almost as large as the feed, for example in the treatment of water having low sulphate concentrations, such as 1–7 g/l, the sulphate-reducing system can be set up in two stages, the sulphate concentration being kept at the value mentioned above in the first stage and being further reduced in the second stage.

The bacteria which can be used for the anaerobic step of the method according to the invention, the reduction of sulphur compounds to sulphide, are in particular sulphur- and sulphate-reducing bacteria (SRB), such as those of the genera Desulfovibrio, Desulfotomaculum, Desulfomonas, Desulfobulbus, Desulfobacter, Desulfococcus, Desulfonema, Desulfosarcina, Desulfobacterium and Desulforomas.

The SRB can be classified according to their metabolism. The completely oxidising sulphate-reducing bacteris (c-SRB) are capable of oxidising their organic substrate to $CO_2$, whereas the incompletely oxidising sulphate-reducing bacteria (i-SRB) oxidise the organic substrate to acetate, which cannot be oxidised further. The i-SRB grow considerably faster (about 5 times) than the c-SRB. Suitable sulphate-reducing bacteria are generally available from diverse anaerobic cultures and/or grow spontaneously in the reactor.

Figure 2:
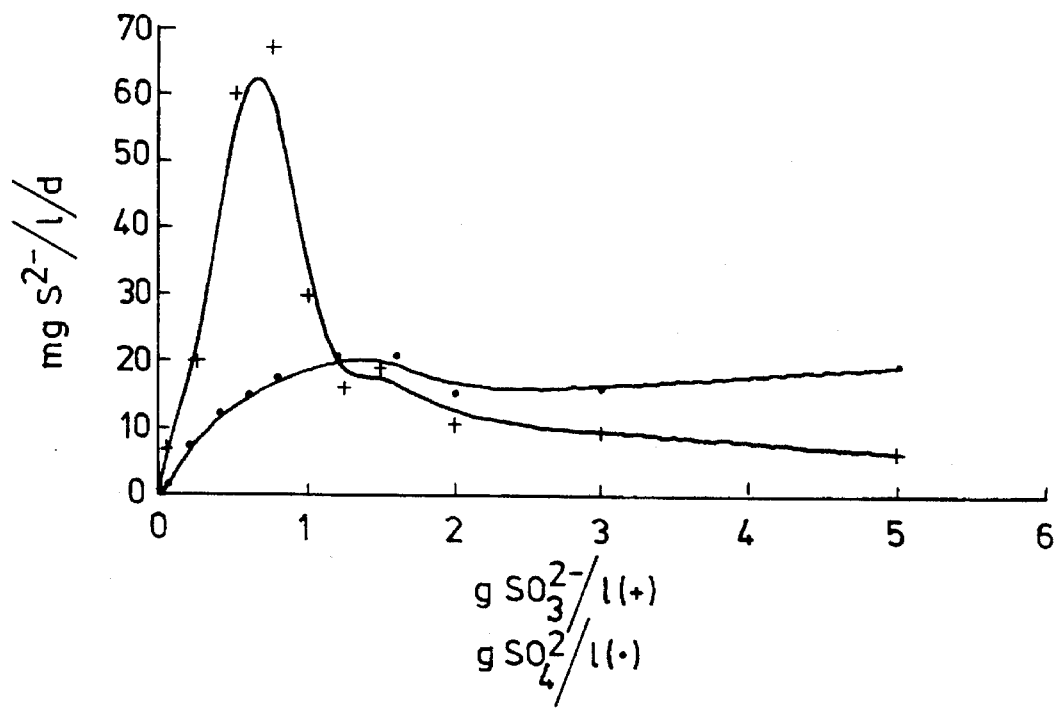

The optimum sulphate and sulphite concentrations as mentioned above differ somewhat for these types of SRB. For i-SRB, the sulphate concentration is preferably between 0.5 and 3 g/l, and particularly between 1 and 2 g/l, whereas the sulphite concentration is preferably between 0.5 and 2 g/l, in particular between 0.9 and 1.5 g/l (FIG. 1). For c-SRB the sulphate concentration is preferably between 0.4 and 5 g/l, and particularly between 1 and 2 g/l, whereas the sulphite concentration is preferably between 0.3 and 1.5 g/l, in particular between 0.4 and 1 g/l (FIG. 2). The accompanying FIGS. 1 and 2 show the sulphide forming activity in mg per l of medium per day of the i-SRB and c-SRB respectively, as a function of the sulphate (.) and sulphiate (+) concentration.

The salt concentration according to measure (b) is preferably kept at about 6 g $Na^+$/l or higher, under mesophilic conditions, i.e. at moderate temperatures of e.g. 20°–40° C. Under these conditions, the salt concentration is preferably at least 7 g/l, more preferably between 10 and 25 g Na/l and in particular between 12 and 14 g Na/l. Under thermophilic conditions, i.e. at temperatures about 40° C., especially above 45° C., which temperatures may be used in flue gas desulphurisation, the salt concentration may be lower in order to obtain a similar favourable effect on electron donor consumption. When an electron donor having two or more carbon atoms, such as ethanol, is used under thermophilic conditions, the preferred sodium concentration is at least 3 g/l, more particularly 4 to 8 g/l. For one-carbon electron donors such as methanol, the optimum thermophilic salt concentration is different and is preferably between 6 and 14 Na/l.

For salts having other cations than sodium, corresponding concentrations apply. For example for potassium at least about 10 g/l, preferably at least 12 g/l is used. Instead of the salt concentration, the conductivity can be used as a parameter: under mesophilic conditions, this is at least about 24 mS/cm, and does not exceed 90 mS/cm; the conductivity is particularly situated between 24 and 48 mS/cm. Under thermophilic these values are correspondingly lower: from 12 to 56 mS/cm.

It was found that a minimum sulphide concentration in the anaerobic influent of about 100 mg/l results in a relative benefit for the SRB. The minimum sulphide concentration according to measure (c) can for example be achieved by adding sulphide to the reactor influent during the start-up of the anaerobic reactor, and partly recycling the reactor effluent so as to maintain the concentration of sulphide at the desired level. The sulphide concentration is preferably at least 100, more preferably at least 150 mg/l, most preferably at least 200 mg/l, whereas sulphide concentrations above 500 mg/l do not generally lead to further improvements.

As a preferred additional measure, a biofilm thickness of the anaerobic bacteria of less than 0.5 mm is maintained. This can be achieved for example by applying a strong turbulence in the medium, for example by gas injection. The thickness can also be controlled through the choice of the carrier material. The carrier material preferably has a surface area of 50 to 250 $m^2/m^3$ when a "fixed film" or filter bed is used; when a fluidised bed or an "air-lift loop" is used, the surface area may be larger, up to 3000 $m^2/m^3$. The biofilm thickness is preferably less than 0.25 mm. In order to obtain thinner biofilms, it may be advantageous to use flocculant sludge rather than granular sludge.

The measures (a), (b) and (c) described above can advantageously be combined, e.g. a high effluent sulphate/sulphite concentration (a) simultaneously with a high salt concentration (b), or a high effluent sulphate/sulphite concentration (a) simultaneously with a high influent sulphide concentration (c), or a high salt concentration (b) simultaneously with a high influent sulphide concentration (c).

Furthermore, the reaction is found to proceed more advantageously if the pH of the anaerobic medium is kept above 7.5.

The anaerobic treatment can preferably be carried out, at least for a portion of the time, at an elevated temperature, in particular at a temperature of 40°–100° C. The elevated temperature can be used continuously or virtually continuously, for example when an inexpensive energy source is available, as in the case of hot flue gases and/or a warm wash liquid. In those cases, an electron donor is usually not present in the waste water itself, and an economic use of the added electron donor is then especially important. A suitable elevated temperature is in particular a temperature of 45°–70° C., more in particular 50°–55° C. The anaerobic treatment can also be carried out at an elevated temperature periodically. A temperature of 60°–80° C. is particularly suitable for the periodic increase in temperature. The elevated temperature can be maintained for a period of from one hour or a few hours to several days, for example 1 week.

Measure (d) relates to the use of an inhibitor, especially for the methane-producing bacteria. Thus, the consumption of the electron donor is reduced by introducing an inhibitor into the anaerobic treatment medium, which inhibitor is more toxic to the methane-producing bacteria than to the incompletely oxidising sulphate-reducing bacteria or the sulphate-reducing bacteria oxidising compounds having one carbon atom.

In the process for removing sulphur compounds from water according to the invention, the water is subjected to anaerobic treatment with bacteria, which usually comprise incompletely oxidising sulphate-reducing bacteria, sulphate-reducing bacteria oxidising compounds having one carbon atom, as well as methane-producing bacteria. In general, the i-SRB secrete acetate when using substrates containing two or more carbon atoms, which acetate can only be degraded by the c-SRB. Therefore, the process according to the invention using inhibitors can be applied more successfully if electron donors are added, which do not produce acetate upon metabolisation by the bacteria. Preferably, a compound without carbon atoms or with only one carbon atom, such as hydrogen, methane, methanol, formaldehyde, formic acid and carbon monoxide, is used as an electron donor.

It has been found that halogenated compounds having one carbon atom are suitable as inhibitors for use in the process according to the invention, chloroform being preferably used as an inhibitor.

As an alternative, monochloromethane, dichloromethane, and tetrachloromethane can also be used as halogenated compounds having one carbon atom. Tetrachloromethane has the property of being converted to chloroform and/or methane compounds having less than three chlorine atoms under the anaerobic conditions of the present process. In addition to chlorinated compounds, brominated and iodinated methane compounds can also be used successfully.

The inhibitor can be used for example in an amount of 0.01–20 mg, preferably 0.05–5 mg per liter of the treating medium. The activity of the inhibitor has an optimum value at a concentration of about 0.1 g/l in the case of chloroform.

Measure d) may be combinated with one or more of the measures a), b) and c) discussed above.

Various water effluents can be treated using the process of the invention, for example groundwater, mining effluent, industrial waste water, for example originating from the printing industry, metallurgy, leather, rubber, viscose and fibre industry, paper industry and polymer industry, and wash water of flue gas treatment plants.

The invention also relates to a process for the treatment of sulphur-containing flue gas, in which the flue gas is washed with a wash liquid and the wash liquid is regenerated and the wash liquid is re-generated using the process of the invention described above. In the case of flue gas treatment, the $SO_2$ can be removed from the flue gases using a large scrubber and then fed in dissolved form in the wash water to the anaerobic reactor. The dissolved $SO_2$ is mainly in the form of sulphite and bisulphite. This sulphite and bisulphite are converted to sulphide in the anaerobic biological reactor.

The sulphide formed can then be oxidised to elementary sulphur in a separate reactor. The elementary sulphur can be used as raw material for various applications.

This oxidation is preferably carried out in a second biological reactor. In the second biological reactor oxygen metering is controlled such that the sulphide is mainly oxidised to sulphur and not, or only to a slight extend, to sulphate. The partial oxidation can be effected by, for example, keeping the amount of sludge in the reactor low or by using a short residence time. However, it is preferred to use a deficiency of oxygen. The amount of oxygen can be rapidly and simply adjusted to the requirements of the stream to be treated.

The process according to the invention can be used for a wide variety of sulphur compounds: in the first place, the method is particularly suitable for the removal of inorganic sulphate and sulphite. Further possible compounds are other inorganic sulphur compounds such as thiosulphate, tetrathionate, dithionite, elementary sulphur and the like. Organic sulphur compounds, such as alkanesulphonates, dialkyl sulphides, dialkyl disulphides, mercaptans, sulphones, sulphoxides, carbon disulphide and the like can also be removed from water by the process according to the invention.

The product from the process according to the invention is, if post-oxidation is employed, elementary sulphur, which can be separated off simply from water, for example by settling, filtration, centrifuging or flotation, and can be re-used.

For the post-oxidation of sulphide with sulphide-oxidising bacteria and a deficiency of oxygen, use can be made of the method of Netherlands Patent Application 88.01009. The bacteria which can be used in this case come from the group of colourless sulphur bacteria, such as Thiobacillus, Thiomicrospira, Sulfolobus and Thermothrix.

EXAMPLES

Table A illustrates the effect of the sulphate concentration on the ethanol consumption for a reactor containing granular sludge grown on waste water from a paper industry and then adapted to ethanol.

TABLE A

Effect of the sulphate concentration on the ethanol consumption during sulphate reduction.

| sulphate concentration (mg/l) | kg sulphide/ kg ethanol | mole ethanol/mole sulphate |
|---|---|---|
| 500 | 1.4 | 1.04 |
| 1400 | 2.2 | 0.65 |

Table B shows the effect of the salt concentration on the consumption of methanol (electron donor) during sulphate reduction using granular sludge grown on waste water and then adapted to methanol (30° C., pH 7.5, residence time 5 hours). It follows that per kg of sulphide produced, only about 25% of the amount of methanol is used by raising the salt concentration. The theoretical maximum is 0.75 mg $S^{2-}$ per kg of methanol.

TABLE B

Effect of the salt concentration on the methanol consumption during sulphate reduction.

| salt concentration (g $Na^+$/l) | % methanol consumption for sulphate reduction with respect to total consumption | kg of sulphide production per kg of methanol consumption |
|---|---|---|
| 0.2 | 11% | 0.09 |
| 12.5 | 50% | 0.38 |

Table C shows the effect of the salt concentration on the sulphate reduction for a reactor containing granular sludge grown on a mixture of acetate, propionate and butyrate using mesophilic conditions.

TABLE C

Effect of the salt concentration, expressed in $Na^+$, on the sulphate reduction and methane production.

| salt concentration $Na^+$ (g/l) | sulphate reduction % w.r. to maximum | methane production % w.r. to maximum |
|---|---|---|
| 5 | 100 | 100 |
| 7.5 | 100 | 50 |
| 10 | 100 | 25 |
| 12.5 | 100 | 10 |
| 15 | 55 | 5 |

Table D illustrates the effect of sodium concentration on the sulphidogenic and methanogenic activity (% with respect to theoretical maximum) in a thermophilic system (55° C.) containing sulphate/sulphite and ethanol.

Table E shows the effect of sodium concentration on the sulphidogenic and methanogenic activity (% with respect to theoretical maximum) in a thermophilic system (55° C.) containing sulphate/sulphite and methanol.

TABLE D

| sodium concentration (g/l) | sulphide produced (% of maximum) | methane produced (% of theor. maximum) |
|---|---|---|
| 5.0 | 100 | (not determined) |
| 7.5 | 70 | 0 |
| 10.0 | 55 | 0 |
| 12.5 | 50 | 0 |
| 15.0 | 50 | 0 |
| 20.0 | 50 | 0 |

TABLE E

| sodium concentration (g/l) | sulphide produced (% of maximum) | methane produced (% of theor. maximum) |
|---|---|---|
| 5.0 | 83 | 88 |
| 7.5 | 100 | 88 |
| 10.0 | 88 | 88 |
| 12.5 | 92 | 88 |
| 15.0 | 75 | not determined |
| 20.0 | 15 | not determined |

Table F shows the effect of biofilm thickness on the sulphate reduction for a reactor containing granular sludge grown on a mixture of acetate and glucose.

TABLE F

Effect of biofilm thickness on the sulphate reduction and methane production

| Diameter sludge particles (mm) | sulphate reduction (g/g $VSS^1$.day) | methane production (g/g VSS.day) |
|---|---|---|
| >2 | <0.1 | 0.5 |
| 1–2 | <0.1 | 0.6 |
| 0.5–1 | 0.12 | 0.55 |
| 0.25–0.5 | 0.2 | 0.45 |
| 0.125–0.25 | 0.3 | 0.3 |

[1]VSS Volatile Suspended Solids, the proportion of the suspended material which does not remain in the ashes upon incineration Table G summarises the inhibition by a number of chlorinated compounds, which cause an inhibition rate of 50 or 80% respectively of the activity of the MPB, i-SRB and c-SRB. The numerical values indicated refer to the concentration of the relevant inhibitor in mg/l.

TABLE G

| | MPB | | i-SRB | | c-SRB | |
|---|---|---|---|---|---|---|
| inhibitor | 50% | 80% | 50% | 80% | 50% | 80% |
| p-chlorobenzyl mercaptan | 210 | 375 | 29 | 232 | 46 | 84 |
| p-chlorobenzyl chloride | 14 | 27 | 7 | 16 | 2 | 14 |
| chloroform | 0.90 | 1.48 | 8.0 | >100 | 0.7 | 1.4 |
| chlorobenzene | 350.6 | 470.7 | 85 | 620 | 52 | 176 |
| 1,2-dichlorobenzene | 179.4 | 260.2 | 34 | 118 | 39 | 116 |
| 1,2,3-trichlorobenzene | 94.4 | 119.8 | 58 | 172 | 37 | 88 |
| 2-chlorophenol | 410.2 | 515.7 | 105 | 345 | 78 | 197 |
| 2,4-dichlorophenol | 79.9 | 104.3 | 22 | 51 | 10 | 54 |

TABLE G-continued

| | MPB | | i-SRB | | c-SRB | |
|---|---|---|---|---|---|---|
| inhibitor | 50% | 80% | 50% | 80% | 50% | 80% |
| 3-chloro-5-methoxyphenol | 65.0 | 125.3 | 32 | 108 | 21 | 78 |

Table H illustrates the effect of influent sulphide on the sulphide production. An influent sulphide concentration of 400 mg/l, in an anaerobic process carried out at 30° C., at pH 7.5, with an influent sulphate concentration of 1500 mg/l, an influent methanol concentration of 1250 mg/l and a residence time of 5 hours, during 60 days, results in a 40% increase of methanol consumption by the SRB.

TABLE H

| Sulphide in influent | Sulphide produced | kg of sulphide produced per kg of methanol consumed |
|---|---|---|
| 0 | 110 mg/l | 0.09 |
| 400 mg/l | 140 mg/l | 0.18 |

Table J shows the anaerobic sulphide producing activity of a batch process carried out at 30° C., at pH 7.5, with an influent sulphate concentration of 1500 mg/l and an influent ethanol concentration of 1250 mg/l, as a function of the initial sulphide concentration.

TABLE J

| Initial sulphide conc. (mg/l) | Maximum activity (mg $S^{2-}$/l/day) |
|---|---|
| 0 | 127 |
| 128 | 160 |
| 324 | 243 |
| 753 | 252 |
| 2013 | 0 |

Table K shows the effect of effluent sulphite on the methanol consumption. A sulphite concentration above about 100 mg/l already results in a higher sulphide/methanol efficiency, and above about 300 mg/l the maximum efficiency is reached.

TABLE K

| sulphite concentration (mg/l) | kg of sulphide produced per kg of methanol consumed |
|---|---|
| 0 | 0.05 |
| 80 | 0.09 |
| 180 | 0.16 |
| 400 | 0.20 |
| 800 | 0.20 |

In the case of flue gas treatment, the process according to the invention can be carried out in an installation such as is shown diagrammatically in FIG. 3. According to this figure, the flue gas contaminated with sulphur dioxide is fed via 1 into a scrubber 2. In this scrubber the flue gas is treated in countercurrent with wash water, which is supplied via 3. The treated flue gas is removed via 4 or further treated. The sulphite-containing wash water is fed via line 5 to an anaerobic reactor 6. An electron donor, such as ethanol, is also fed to the anaerobic reactor 6, via 7. The gas formed in the reactor, which is essentially $CO_2$ and to a lesser extend $H_2S$, is removed via 8 to a gas treatment installation (not shown). The anaerobic effluent, the sulphite concentration of which is maintained at between 300 mg and 2 g per l, is fed via 9 to an aerobic or partially aerobic reactor 10, to which air is also supplied, via 11. The excess air is removed via 12. The sulphur-containing effluent is fed via 13 to a settling tank 14, where the sulphur is separated off and is removed via 15. The effluent from the sulphur settling is removed via 16 and can be re-used as wash water. A fraction can be removed via 17 and if necessary replenishing water, which can also contain buffer and nutrients, is supplied at 18.

I claim:

1. In a process for removing sulphur compounds from water by an anaerobically treating influent water in an anaerobic medium with sulphur- and/or sulphate-reducing bacteria, with the addition of an electron donor, to form sulphide and an anaerobic effluent, the improvement comprising: reducing the consumption of the electron donor by at least one of the following measures:

a) keeping the sulphate concentration in the anaerobic effluent at at least 900 mg/l;
   b) keeping the salt concentration, expressed in sodium ion equivalents, in the anaerobic medium at at least about 6 g/l under mesophilic conditions, or at least 3 g/l under thermophilic conditions.

2. Process according to claim 1, further comprising maintaining a biofilm thickness of anaerobic bacteria of less than 0.5 mm.

3. Process according to claim 1, wherein the sulphate concentration in the anaerobic effluent is kept between 1 and 3 g/l.

4. Process according to claim 1, wherein the salt concentration, expressed in sodium ion equivalents, is kept at at least 7 g/l.

5. Process according to claim 1, further comprising keeping the conductivity of the water, under mesophilic conditions at a value of at least 24 mS/cm.

6. Process according to claim 1, further comprising keeping the conductivity of the water, under thermophilic conditions, at a value of at least 12 mS/cm.

7. Process according to claim 1, further comprising keeping influent sulphide concentration at at least 100 mg/l.

8. Process according to claim 1, wherein the pH of the anaerobic medium is kept above 7.5.

9. Process according to claim 1, wherein the electron donor added is selected from the group consisting of methanol, ethanol, an organic acid, glucose, starch and cellulose.

10. Process according to claim 1, wherein the anaerobic treatment is carried out at a temperature of 40°–100° C. for at least a portion of the time.

11. Process according to claim 1, wherein the anaerobic treatment is carried in two stages, a high sulphate concentration being maintained in the first stage and sulphate concentration being lowered in the second stage.

12. Process according to claim 1, wherein a proportion of anaerobically treated water is recycled.

13. Process according to claim 1, wherein sulphate is removed from water.

14. Process according to claim 1, wherein sulphite is removed from water.

15. Process according to claim 1, wherein thiosulphate is removed from water.

16. Process according to claim 1, wherein the sulphide formed is essentially oxidized to elemental sulphur and the sulphur formed is removed.

17. Process according to claim 16, wherein the sulphide is partially oxidized with sulphide-oxidizing bacteria in the presence of a deficiency of oxygen.

18. Process for the treatment of sulphur-containing flue gas, wherein the flue gas is washed with a wash liquid, and the wash liquid is regenerated, comprising regenerating the wash liquid using the process according to claim 1.

19. In a process for removing sulphur compounds from water, by anaerobically subjecting influent water to an anaerobic treatment medium with sulphur- and/or sulphate-reducing bacteria, with the addition of an electron donor, the improvement comprising reducing the consumption of the electron donor by:

a) introducing a halogenated compound having one carbon atom as an inhibitor into the anaerobic treatment medium in an amount of 0.01–20 mg per liter of the treatment medium, and using as the electron donor one of a compound having no carbon atoms and a compound having one carbon atom and selected from group consisting of hydrogen, methane, methanol, formaldehyde, formic acid and carbon monoxide.

20. Process according to claim 19, wherein chloroform is used as the inhibitor.

21. Process according to claim 19, further comprising at least one of the following measures:

b) keeping the sulphate concentration in the anaerobic effluent at at least 500 mg/l;

c) keeping the salt concentration, expressed in sodium ion equivalents, in the anaerobic treatment medium at at least about 6 g/l under mesophilic conditions, or at least 3 g/l under thermophilic conditions; and d) keeping the influent sulphide concentration at at least 100 mg/l.

* * * * *